United States Patent
Ku et al.

(10) Patent No.: US 11,129,130 B2
(45) Date of Patent: Sep. 21, 2021

(54) METHOD AND DEVICE FOR MEASURING POSITION

(71) Applicant: LG ELECTRONICS INC., Seoul (KR)

(72) Inventors: Gwanmo Ku, Seoul (KR); Sangwook Han, Seoul (KR); Woonghee Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/956,550

(22) PCT Filed: Dec. 21, 2017

(86) PCT No.: PCT/KR2017/015207
§ 371 (c)(1),
(2) Date: Jun. 19, 2020

(87) PCT Pub. No.: WO2019/124586
PCT Pub. Date: Jun. 27, 2019

(65) Prior Publication Data
US 2021/0014821 A1 Jan. 14, 2021

(51) Int. Cl.
*H04W 64/00* (2009.01)
*H04B 17/318* (2015.01)
(Continued)

(52) U.S. Cl.
CPC ........ *H04W 64/006* (2013.01); *H04B 17/318* (2015.01); *H04W 4/40* (2018.02); *H04W 16/28* (2013.01); *H04W 24/10* (2013.01)

(58) Field of Classification Search
CPC .. H04W 64/00; H04W 64/003; H04W 64/006
See application file for complete search history.

(56) References Cited

U.S. PATENT DOCUMENTS

| 2014/0112180 A1 | 4/2014 | Axmon et al. |
| 2016/0249404 A1 | 8/2016 | Hoglund |

(Continued)

FOREIGN PATENT DOCUMENTS

| KR | 1020120113779 | 10/2012 |
| KR | 1020160140756 | 12/2016 |
| WO | 2017204899 | 11/2017 |

OTHER PUBLICATIONS

PCT International Application No. PCT/KR2017/015207, Written Opinion of the International Searching Authority dated Sep. 19, 2018, 21 pages.

*Primary Examiner* — Kevin Kim
(74) *Attorney, Agent, or Firm* — Lee, Hong, Degerman, Kang & Waimey

(57) ABSTRACT

According to an embodiment of the present specification, a method for measuring a position by a terminal in a wireless communication system can be provided. The method for measuring a position by a terminal may comprise the steps of: receiving MIB information from a base station by a terminal; setting a reference for time on the basis of the received MIB information; receiving a positioning-related signal from the base station by the terminal; measuring the positioning-related signal; and acquiring distance information and orientation information of the terminal on the basis of the measured positioning-related signal. The terminal is capable of communicating with at least one of another UE, a UE related to an autonomous driving vehicle, a base station or a network.

16 Claims, 13 Drawing Sheets

(51) Int. Cl.
*H04W 4/40* (2018.01)
*H04W 16/28* (2009.01)
*H04W 24/10* (2009.01)

(56) References Cited

U.S. PATENT DOCUMENTS

2017/0142682 A1* 5/2017 Gunnarsson ............ H04W 4/02
2017/0295531 A1* 10/2017 Singh ...................... H04W 8/08
2017/0367008 A1* 12/2017 Takahashi ............. H04W 48/16
2018/0054795 A1* 2/2018 Edge ..................... H04W 4/029
2018/0132199 A1* 5/2018 Zhang ............... H04W 56/0065
2019/0079195 A1* 3/2019 Chandrasekar ......... G01S 19/07

* cited by examiner

FIG. 7
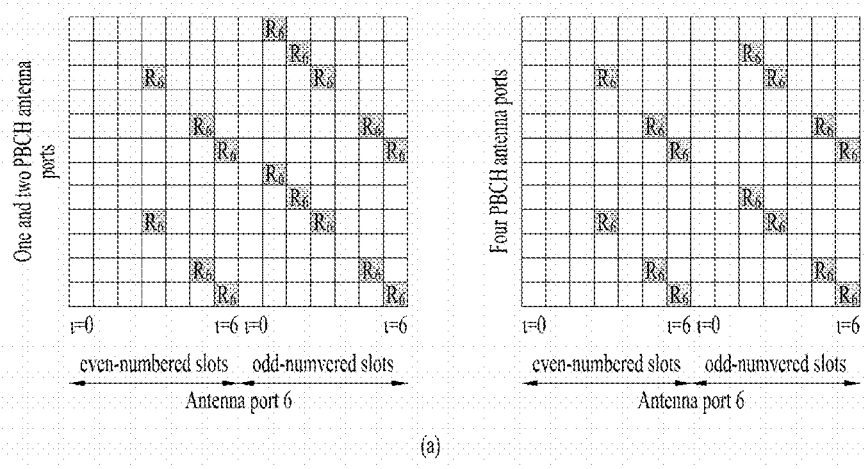
(a)
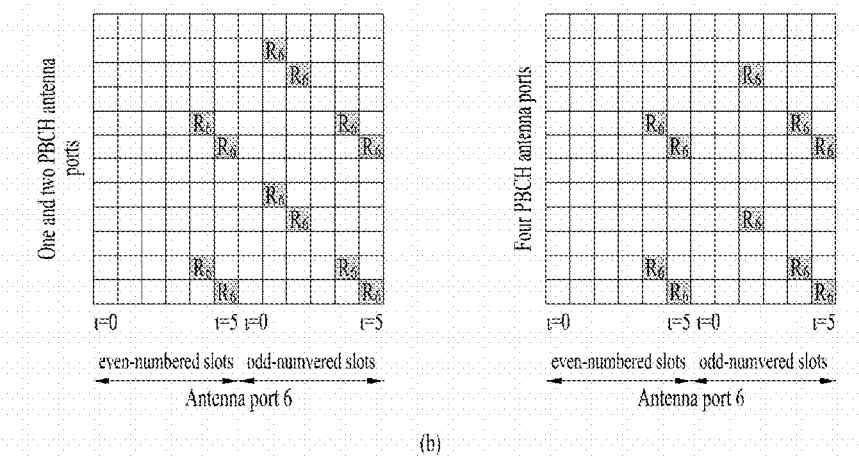
(b)

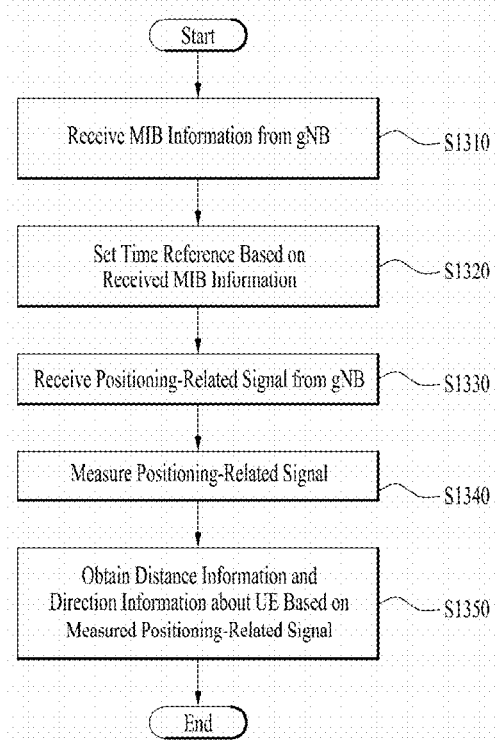

METHOD AND DEVICE FOR MEASURING POSITION

CROSS-REFERENCE TO RELATED APPLICATIONS

This application is the National Stage filing under 35 U.S.C. 371 of International Application No. PCT/KR2017/015207, filed on Dec. 21, 2017, the contents of which are all hereby incorporated by reference herein in its entirety.

TECHNICAL FIELD

The present disclosure relates to a wireless communication system, and more particularly, to a method and apparatus for performing positioning.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, and so on) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

The 3$^{rd}$ generation partnership project (3GPP) long term evolution (LTE) system as a wireless communication system was designed to have a frame structure with a 1-ms transmission time interval (TTI), and a required data latency of 10 ms for a video application. However, with the introduction of new applications such as real-time control and tactile Internet, the future 5' generation (5G) technology requires lower-latency data transmission, and it is expected that the required 5G data latency will be decreased to 1 ms. Furthermore, the future 5G technology requires connectivity of more user equipments (UEs) to one base station (BS), and the 5G required connectivity is expected to increase to up to 1,000,000/km$^2$.

As more and more communication devices require a larger communication capacity, there is a need for enhanced mobile broadband communication beyond legacy radio access technology (RAT). In addition, massive machine type communications (MTC) capable of providing a variety of services anywhere and anytime by connecting multiple devices and objects is another important issue to be considered for next-generation communications. Communication system designs for which services/UEs sensitive to reliability and latency are also under discussion. As such, the introduction of next-generation RAT is under discussion in consideration of enhanced mobile broadband communication (eMBB), massive MTC, and ultra-reliable and low latency communication (URLLC). In the present disclosure, for simplicity, the next-generation RAT will be referred to as New RAT.

DISCLOSURE

Technical Problem

An aspect of the present disclosure is to provide a positioning method in a wireless communication system.

Another aspect of the present disclosure is to provide a positioning method based on a one-way positioning technique.

Another aspect of the present disclosure is to provide a method of transmitting positioning-related information.

Technical Solution

In an aspect of the present disclosure, a method of performing positioning by a user equipment (UE) in a wireless communication system includes receiving master information block (MIB) information from a base station (BS) by the UE, setting a time reference based on the MIB information by the UE, receiving a positioning-related signal from the BS by the UE, measuring the positioning-related signal, and obtaining distance information and direction information about the UE based on the measured positioning-related signal by the UE.

In another aspect of the present disclosure, a UE for performing positioning in a wireless communication system includes a receiver configured to receive a signal, a transmitter configured to transmit a signal, and a processor configured to control the receiver and the transmitter. The processor is configured to receive MIB information from a BS, set a time reference based on the MIB information, receive a positioning-related signal from the BS, measure the positioning-related signal, and obtain distance information and direction information about the UE based on the measured positioning-related signal.

The following is commonly applicable to the method and apparatus for performing positioning in a wireless communication system.

According to an embodiment of the present disclosure, the positioning-related signal may include a time stamp, and the time stamp may be information about a transmitted time of the positioning-related signal.

According to an embodiment of the present disclosure, the method may further include obtaining information about a measured time of the positioning-related signal. The distance information about the UE may be obtained by using the information about the measured time of the positioning-related signal based on the set time reference and the time stamp.

According to an embodiment of the present disclosure, the UE and the BS may share information about an absolute time based on the set time reference.

According to an embodiment of the present disclosure, the UE and the BS may share the information about the absolute time at an orthogonal frequency division multiplexing (OFDM) symbol level based on the set time reference.

According to an embodiment of the present disclosure, the distance information may be measured based on a difference between the information about the measured time of the positioning-related signal and the time stamp.

According to an embodiment of the present disclosure, the positioning-related signal may be allocated to one beam or a plurality of beams and transmitted by the BS.

According to an embodiment of the present disclosure, when the positioning-related signal is be allocated to the plurality of beams and transmitted to the UE, the UE may measure received power information about two beams having a largest signal strength among the plurality of beams and obtain the direction information from the received power information based on information about direction angles allocated to the two beams.

According to an embodiment of the present disclosure, the information about the direction angles of the plurality of beams may be shared between the UE and the BS.

According to an embodiment of the present disclosure, the MIB information may be periodically broadcast by the BS.

Advantageous Effects

The present disclosure may provide a positioning method in a wireless communication system.

The present disclosure may provide a positioning method based on a one-way positioning technique.

The present disclosure may provide a method of transmitting positioning-related information.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 7 is a diagram illustrating a method of mapping a PRS to resource elements (REs);

FIG. 13 is a flowchart illustrating a positioning method of a UE.

BEST MODE

Figure 1:
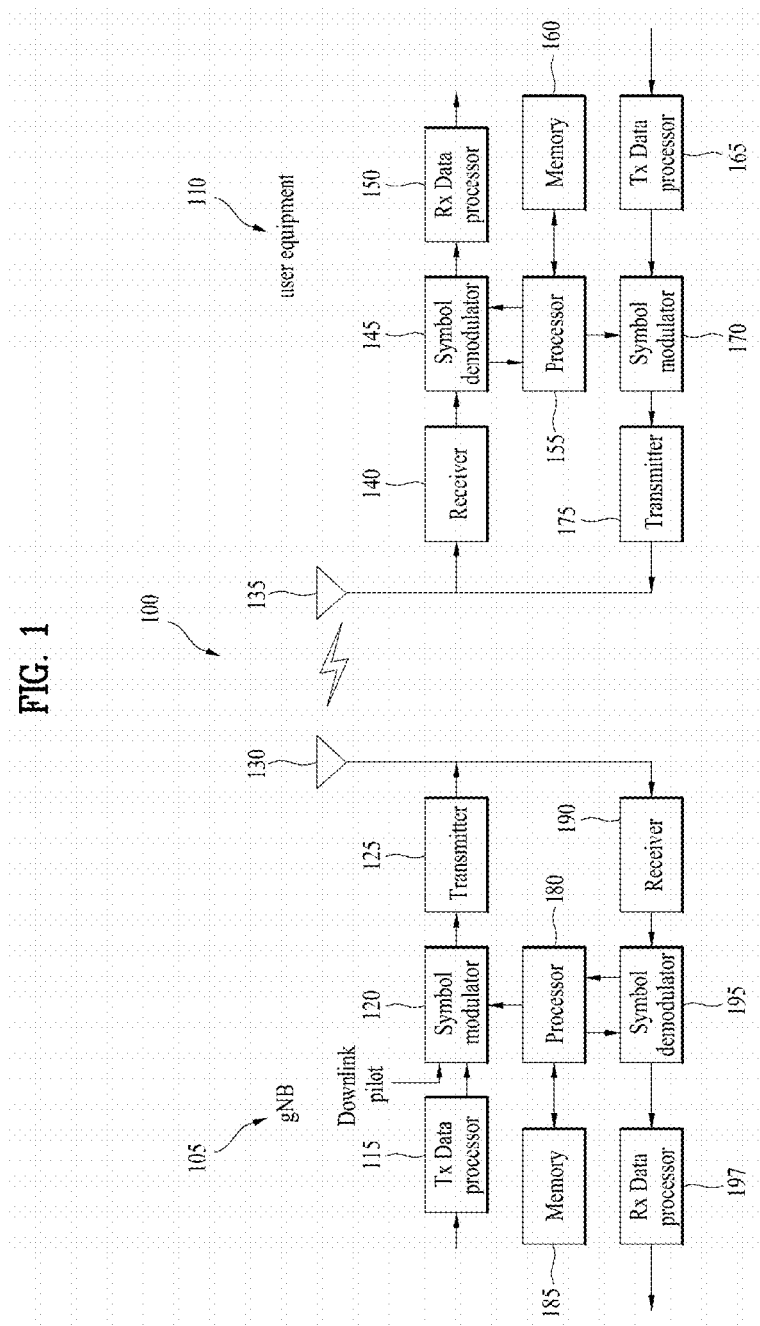
FIG. 1 is a block diagram illustrating configurations of a base station 105 (BS) and a user equipment (UE) 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure may be implemented without these details. For instance, although the following descriptions are given in the context of a mobile communication system being a $3^{rd}$ generation partnership project (3GPP) long term evolution (LTE) or LTE-advanced (LTE-A) system, the same thing applies to any other mobile communication system except features inherent to 3GPP LTE and 3GPP LTE-A.

In some cases, lest it should obscure the subject matter of the present disclosure, known structures and devices are not provided or may be represented in the form of block diagrams, centering on their core functions. Like reference numbers denotes the same components throughout the specification.

In the following description, a terminal generically refers to a mobile or fixed user terminal such as a user equipment (UE), a mobile station (MS), an advanced mobile station (AMS), and so on. A base station (BS) generically refers to any network node communicating with a terminal, such as a Node B, an eNode B, an access point (AP), and so on.

In a mobile communication system, a UE may receive information on downlink (DL) and transmit information on uplink (UL). Information transmitted or received by the UE may include various types of data and control information. Various physical channels exist according to the types and usages of information transmitted or received by the UE.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), and so on. UTRA is a part of universal mobile telecommunications system (UMTS).

3GPP LTE is a part of evolved UMTS (E-UMTS) using E-UTRA. 3GPP LTE employs OFDMA for DL and SC-FDMA for UL. LTE-A is an evolution of 3GPP LTE.

Moreover, in the following description, specific terminologies are provided to help the understanding of the present disclosure. And, the use of the specific terminology can be modified into another form within the scope of the technical idea of the present disclosure.

Regarding wireless transmission between a BS and a UE, transmission from the BS to the UE is referred to as DL transmission, and transmission from the UE to the BS is referred to as UL transmission. Duplex is defined as dividing radio resources between DL transmission and UL transmission. When a frequency band is divided into a DL transmission band and a UL transmission band, for bi-directional transmission and reception, this method is known as frequency division duplex (FDD). It is apparent that the present disclosure applies to time division duplex (TDD) in which time resources are divided into a DL transmission period and a UL transmission period, for bi-directional transmission and reception, and full duplex in which transmission and reception take place in both directions by sharing time and frequency resources, as well as FDD.

FIG. 1 is a block diagram illustrating the configurations of a BS 105 and a UE 110 in a wireless communication system 100.

Although one BS 105 and one UE 110 are shown in the drawing to schematically represent a wireless communication system 100, the wireless communication system 100 may include at least one BS and/or at least one UE.

Referring to FIG. 1, a BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197.

And, a UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present disclosure supports a multiple input multiple output (MIMO) system. And, the BS 105 according to the present disclosure may support both single user-MIMO (SU-MIMO) and multi user-MIMO (MU-MIMO) systems.

In DL, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconversion), and then generates a DL signal suitable for a transmission on a radio channel. Subsequently, the DL signal is transmitted to the UE via the antenna 130.

In the configuration of the UE 110, the receiving antenna 135 receives the DL signal from the BS and then provides the received signal to the receiver 140. The receiver 140 adjusts the received signal (e.g., filtering, amplification and frequency downconversion), digitizes the adjusted signal, and then obtains samples. The symbol demodulator 145 demodulates the received pilot symbols and then provides them to the processor 155 for channel estimation.

The symbol demodulator 145 receives a frequency response estimated value for DL from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values. The processing by the symbol demodulator 145 and the processing by the received data processor 150 are complementary to the processing by the symbol modulator 120 and the processing by the transmitted data processor 115 in the BS 105, respectively.

In the UE 110 in UL, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an UL signal. This UL signal is then transmitted to the BS 105 via the antenna 135. In the UE 110 and the BS 105, transmitter and receiver may be configured as one RF (Radio Frequency) unit.

In the BS 105, the UL signal is received from the UE 110 via the antenna 130. The receiver 190 processes the received UL signal and then obtains samples. Subsequently, the symbol demodulator 195 processes the samples and then provides pilot symbols received in UL and a data symbol estimated value. The received data processor 197 processes the data symbol estimated value and then reconstructs the traffic data transmitted from the UE 110.

The processor 155/180 of the UE/BS 110/105 directs operations (e.g., control, adjustment, management, etc.) of the UE/BS 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof.

In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a UE/BS and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A UE and a BS may be able to exchange RRC messages with each other through a wireless communication network and RRC layers.

In the present specification, although the processor 155/180 of the UE/BS performs an operation of processing signals and data except a function for the UE/BS 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 2:
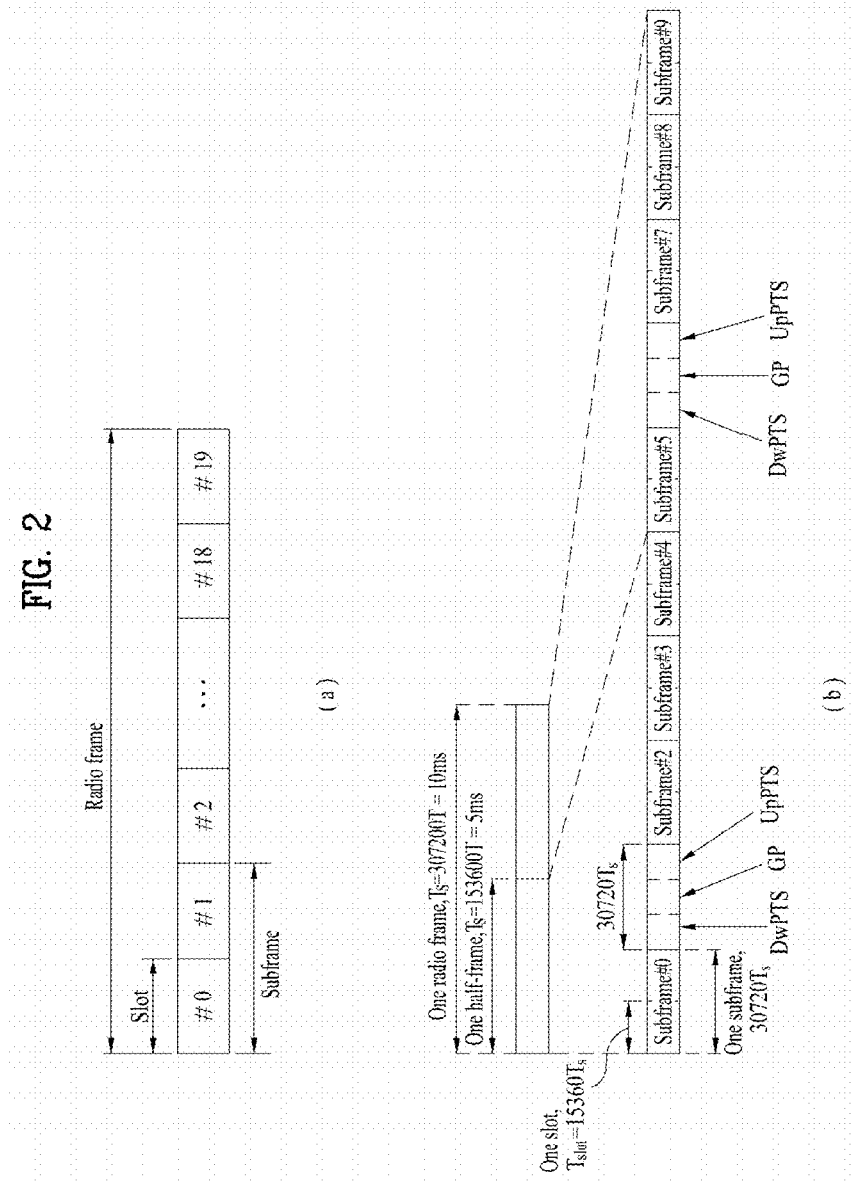
FIG. 2 is a diagram illustrating an exemplary radio frame structure in a wireless communication system.

FIG. 2 illustrates an exemplary radio frame structure used in a wireless communication system. FIG. 2(a) illustrates a frame structure for FDD used in a 3GPP LTE/LTE-A system, and FIG. 1(b) illustrates a frame structure for TDD used in the 3GPP LTE/LTE-A system.

Referring to FIG. 2, a radio frame used in the 3GPP LTE/LTE-A system has a length of 10 ms (307200 Ts) and includes 10 equal-sized subframes. The 10 subframes in the radio frame may be numbered. Herein, Ts denotes a sampling time expressed as Ts=1/(2048*15 kHz). Each subframe has a length of 1 ms and includes two slots. 20 slots in the radio frame may be sequentially numbered from 0 to 19. Each slot has a length of 0.5 ms. A time for transmitting a subframe is defined as a transmission time interval (TTI). Time resources may be identified by a radio frame number (or radio frame index), a subframe number (or subframe index), and a slot number (or slot index).

The radio frame may be configured differently according to duplex mode. DL transmission is distinguished from UL transmission by frequency in FDD mode, and thus the radio frame includes only one of a DL subframe and a UL subframe in a specific frequency band. In TDD mode, DL transmission is distinguished from UL transmission by time, and thus the radio frame includes both a DL subframe and a UL subframe in a specific frequency band.

Table 1 illustrates DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields of downlink pilot time slot (DwPTS), guard period (GP), and uplink pilot time slot (UpPTS). DwPTS is a period reserved for DL transmission and UpPTS is a period reserved for UL transmission. Table 2 lists special subframe configurations.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

FIG. 2 illustrates an exemplary DL/UL slot structure in a wireless communication system. Particularly, FIG. 2 illustrates a resource grid structure in the 3GPP LTE/LTE-A system. There is a resource grid per antenna port.

Figure 3:
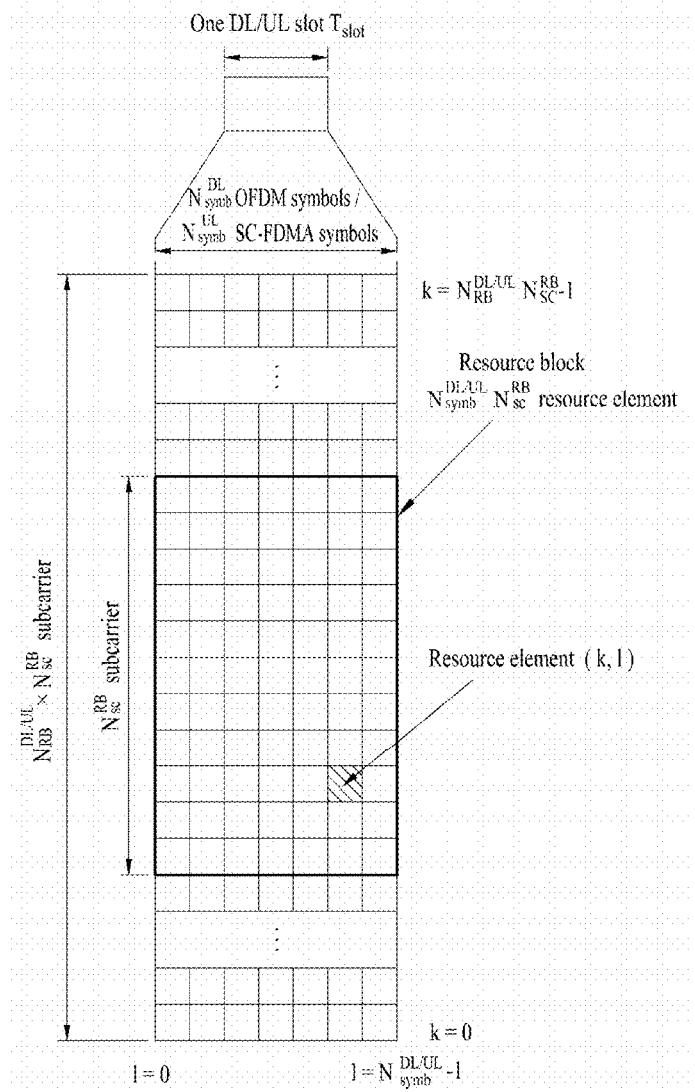
FIG. 3 is a diagram illustrating an exemplary downlink/uplink (DL/UL) slot structure in a wireless communication system.

Referring to FIG. 3, a slot includes a plurality of orthogonal frequency division multiplexing (OFDM) symbols in the time domain and a plurality of resource blocks (RBs) in the frequency domain. An OFDM symbol also refers to a symbol period. Referring to FIG. 3, a signal transmitted in each slot may be represented by a resource grid including $N_{RB}^{DL/UL} * N_{sc}^{RB}$ subcarriers by $N_{symb}^{DL/UL}$ OFDM symbols. Herein, $N_{RB}^{DL}$ denotes the number of RBs in a DL slot and $N_{RB}^{UL}$ denotes the number of RBs in a UL slot. $N_{RB}^{DL}$ and $N_{RB}^{UL}$ depend on a DL transmission bandwidth and a UL transmission bandwidth, respectively. $N_{symb}^{DL}$ denotes the number of OFDM symbols in the DL slot, and $N_{symb}^{UL}$ denotes the number of OFDM symbols in the UL slot. $N_{sc}^{RB}$ denotes the number of subcarriers in one RB.

An OFDM symbol may be called a single carrier frequency division multiplexing (SC-FDM) symbol according to a multiple access scheme. The number of OFDM symbols included in a slot may vary according to a channel bandwidth and the length of a cyclic prefix (CP). For example, a slot includes 7 OFDM symbols in the case of a normal CP and 6 OFDM symbols in the case of an extended CP. While FIG. 3 illustrates a subframe in which a slot includes 7 OFDM symbols for convenience, embodiments of the present disclosure may be equally applied to subframes having different numbers of OFDM symbols. Referring to FIG. 3, each OFDM symbol includes $N_{RB}^{DL/UL} * N_{sc}^{RB}$ subcarriers in the frequency domain. Subcarrier types may be classified into a data subcarrier for data transmission, a reference signal (RS) subcarrier for RS transmission, and null subcarriers for a guard band and a direct current (DC) component. The null subcarrier for a DC component is a subcarrier remaining unused and is mapped to a carrier frequency ID during OFDM signal generation or frequency upconversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, resources including an OFDM symbol and a subcarrier are called a resource element (RE) or a tone. Accordingly, an RB is includes $N_{symb}^{DL/UL} * N_{sc}^{RB}$ REs. Each RE in a resource grid may be uniquely defined by an index pair (k, l) in a slot. Herein, k is an index ranging from 0 to $N_{symb}^{DL/UL} * N_{sc}^{RB} - 1$ in the frequency domain, and l is an index ranging from to $N_{symb}^{DL/UL} - 1$ in the time domain.

Two RBs occupying $N_{sc}^{RB}$ consecutive subcarriers in a subframe, each being disposed in one of two slots of the subframe are called a physical resource block (PRB) pair. The two RBs of a PRB pair have the same PRB number (or PRB index). A virtual resource block (VRB) is a logical resource allocation unit for resource allocation. The VRB has the same size as that of the PRB. VRBs may be classified into localized VRB and distributed VRB depending on VRB-to-PRB mapping. Localized VRBs are mapped into PRBs and thus VRB numbers (VRB indexes) correspond to PRB numbers. That is, nPRB=nVRB. Localized VRBs are numbered from 0 to $N_{VRB}^{DL} - 1$, and $N_{VRB}^{DL} = N_{RB}^{DL}$. Accordingly, according to the localized mapping scheme, VRBs having the same VRB number are mapped into PRBs having the same PRB number in the first slot and the second slot. On the other hand, distributed VRBs are mapped to PRBs through interleaving. Accordingly, VRBs having the same VRB number may be mapped to PRBs having different PRB numbers in the first slot and the second slot. Two PRBs located in two slots of the subframe, respectively and having the same VRB number are referred to as a pair of VRBs.

Figure 4:
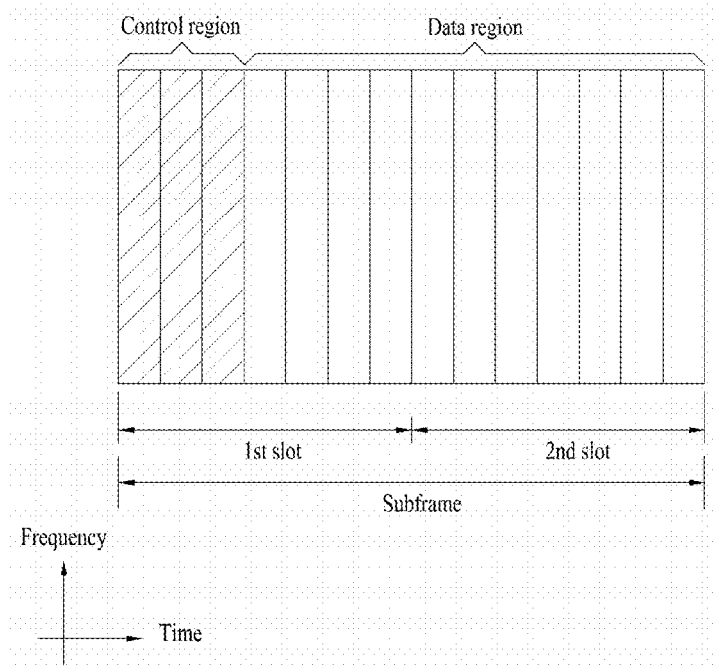
FIG. 4 is a diagram illustrating an exemplary DL subframe structure in a $3^{rd}$ generation partnership project (3GPP) long term evolution (LTE)/LTE-advanced (LTE-A) system.

FIG. 4 illustrates an exemplary DL subframe structure used in the 3GPP LTE/LTE-A system.

Referring to FIG. 4, a DL subframe is divided into a control region and a data region. A maximum of three (or four) OFDM symbols at the start of the first slot in a subframe correspond to the control region to which a control channel is allocated. A resource region available for PDCCH transmission in the DL subframe is referred to as a PDCCH region. The remaining OFDM symbols correspond to the data region to which a physical downlink shared chancel (PDSCH) is allocated. A resource region available for PDSCH transmission in the DL subframe is referred to as a PDSCH region. Examples of DL control channels used in 3GPP LTE include a physical control format indicator channel (PCFICH), a physical downlink control channel (PDCCH), a physical hybrid ARQ indicator channel (PHICH), and so on. The PCFICH is transmitted in the first OFDM symbol of a subframe and carries information about the number of OFDM symbols used for transmission of control channels in the subframe. The PHICH carries an HARQ acknowledgment (ACK)/negative acknowledgment (NACK) signal in response to a UL transmission.

Control information delivered on the PDCCH is called downlink control information (DCI). The DCI includes resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of a higher layer control message such as a random access response transmitted on the PDSCH, a transmit control command set for individual UEs in a UE group, a transmit power control command, information indicating voice over IP (VoIP) activation, a downlink assignment index (DAI), and so on. The transport format and resource allocation information of the DL-SCH are also called DL scheduling information or a DL grant, and the transport format and resource allocation information of the UL-SCH are also called UL scheduling information or a UL grant. The size and purpose of DCI carried on a PDCCH depend on a DCI format, and the size of DCI may vary according to a coding rate. Various formats, for example, formats 0 and 4 for UL and formats 1, 1A, 1B, 1C, 1D, 2, 2A, 2B, 2C, 3 and 3A for DL have been defined in the current 3GPP LTE system. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), and son is selected and combined based on a DCI format and transmitted as DCI to a UE.

In general, a DCI format for a UE depends on a transmission mode (TM) configured for the UE. In other words, only DCI format(s) corresponding to a specific TM may be used for a UE configured with the specific TM.

A PDCCH is transmitted on one or more aggregated consecutive control channel elements (CCEs). A CCE is a logical allocation unit used to provide the PDCCH with a coding rate based on the state of a radio channel. The CCE corresponds to a plurality of resource element groups (REGs). For example, a CCE corresponds to 9 REGs and an REG corresponds to 4 REs. 3GPP LTE defines a CCE set in which a PDCCH may be located for each UE. A CCE set from which a UE may detect a PDCCH directed to it is called a PDCCH search space, simply, a search space. An individual resource in which the PDCCH may be transmitted in the search space is called a PDCCH candidate. A set of PDCCH candidates to be monitored by the UE is defined as a search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space are given as follows.

TABLE 3

| Type | Search Space $S_k^{(L)}$ Aggregation Level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to a CCE aggregation level. An eNB transmits a PDCCH (DCI) on an arbitrary PDCCH candidate in a search space, and a UE monitors the search space to detect the PDCCH (DCI). Herein, monitoring refers to attempting to decode each PDCCH in the corresponding search space according to all monitored DCI formats. The UE may detect a PDCCH directed to it by monitoring a plurality of PDCCHs. Since the UE does not know the position in which the PDCCH for the UE is transmitted, the UE attempts to decode all PDCCHs of the corresponding DCI format in each subframe until a PDCCH having the ID of the UE is detected. This process is called blind detection (or blind decoding (BD)).

The eNB may transmit data for a UE or a UE group in a data region. Data transmitted in the data region is also called user data. For transmission of the user data, a physical downlink shared channel (PDSCH) may be allocated to the data region. A PCH and a DL-SCH are transmitted on the PDSCH. The UE may read data transmitted on the PDSCH by decoding control information transmitted on a PDCCH. Information indicating a UE or a UE group to which data is transmitted on the PDSCH, information indicating how the UE or UE group is supposed to receive and decode the PDSCH data, and so on are included in the PDCCH. For example, if a specific PDCCH is CRC (cyclic redundancy check)-masked with radio network temporary identify (RNTI) "A" and information about data transmitted in radio resource (e.g. frequency position) "B" based on transmission format information (e.g. a transport block size, a modulation scheme, coding information, and so on) "C" is transmitted in a specific DL subframe, UEs monitor PDCCHs using their RNTI information. A UE having RNTI "A" detects the PDCCH and receives a PDSCH indicated by "B" and "C" using information about the PDCCH.

To demodulate a signal received from the eNB, the UE needs an RS to be compared with a data signal. An RS refers to a predetermined signal in a specific waveform, which is transmitted from the eNB to the UE or from the UE to the eNB and known to both the eNB and UE. The RS is also called a pilot. RSs are categorized into a cell-specific RS shared by all UEs in a cell and a modulation RS (DM RS) dedicated to a specific UE. A DM RS transmitted by the eNB for demodulation of DL data for a specific UE is called a UE-specific RS. Both or one of DM RS and CRS may be transmitted on DL. When only the DM RS is transmitted without the CRS, an RS for channel measurement needs to be additionally provided because the DM RS transmitted using the same precoder as used for data may be used for demodulation only. For example, in 3GPP LTE(-A), CSI-RS corresponding to an additional RS for measurement is transmitted to the UE such that the UE may measure channel state information. The CSI-RS is transmitted in each transmission period spanning a plurality of subframes based on the fact that a channel state does not change much over time, compared to the CRS transmitted in each subframe.

Figure 5:
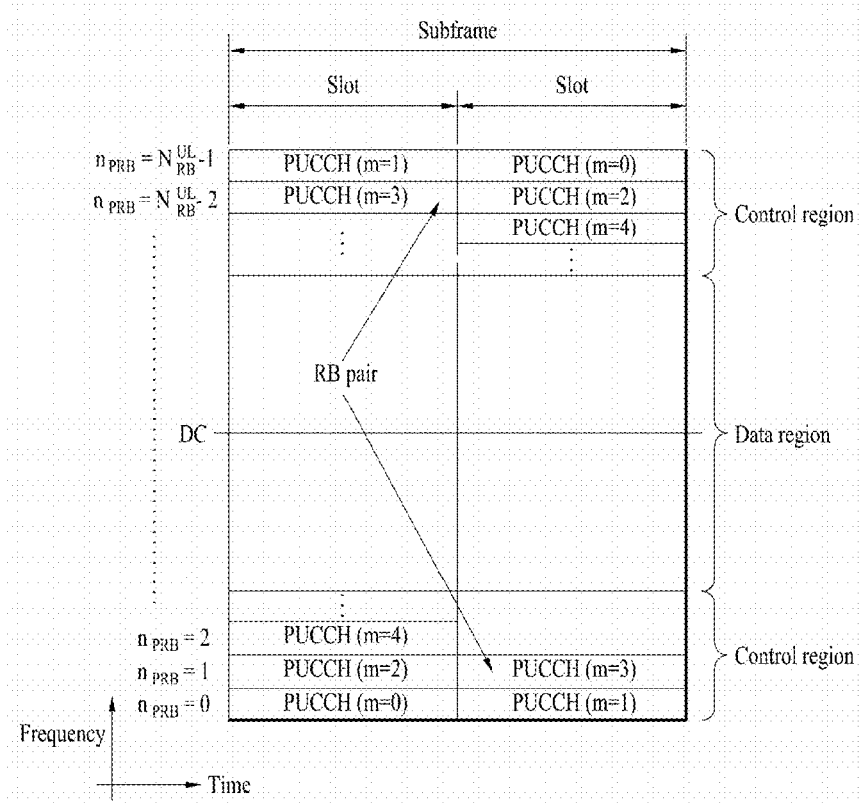
FIG. 5 is a diagram illustrating an exemplary UL subframe structure in the 3GPP LTE/LTE-A system.

FIG. 5 illustrates an exemplary UL subframe structure used in the 3GPP LTE/LTE-A system.

Referring to FIG. 5, a UL subframe may be divided into a control region and a data region in the frequency domain. One or more physical uplink control channels (PUCCHs) may be allocated to the control region to carry uplink control information (UCI). One or more physical uplink shared channels (PUSCHs) may be allocated to the data region of the UL subframe to carry user data.

In the UL subframe, subcarriers far from the DC subcarrier are used as the control region. In other words, subcarriers at both ends of a UL transmission bandwidth are allocated for UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and the RBs of the RB pair occupy different subcarriers in two slots. When a PUCCH is allocated in this manner, it is said that an RB pair allocated to the PUCCH frequency-hops over a slot boundary. When frequency hopping is not applied, the RB pair occupies the same subcarriers.

The PUCCH may be used to transmit the following control information.

Scheduling Request (SR): This is information used to request a UL-SCH resource and is transmitted by On-Off Keying (OOK).

HARQ ACK/NACK: This is a response signal to a DL data packet on a PDSCH and indicates whether the DL data packet has been successfully received. A 1-bit ACK/NACK signal is transmitted as a response to a single DL codeword, and a 2-bit ACK/NACK signal is transmitted as a response to two DL codewords. HARQ-ACK responses include positive ACK (ACK), negative ACK (NACK), discontinuous transmission (DTX) and NACK/DTX. Here, the term HARQ-ACK is used interchangeably with the terms HARQ ACK/NACK and ACK/NACK.

Channel state information (CSI): This is feedback information for a DL channel. MIMO-related feedback information includes a rank indicator (RI) and a precoding matrix indicator (PMI).

The amount of control information (UCI) that a UE may transmit in a subframe depends on the number of SC-FDMA symbols available for control information transmission. The SC-FDMA symbols available for control information transmission correspond to SC-FDMA symbols other than SC-FDMA symbols used for RS transmission in the subframe. In the case of a subframe in which a sounding reference signal (SRS) is configured, the last SC-FDMA symbol of the subframe is excluded from the SC-FDMA symbols available for control information transmission. An RS is used for coherent detection of a PUCCH. The PUCCH supports various formats according to information transmitted on the PUCCH.

Table 4 illustrates the mapping relationship between PUCCH formats and UCI in the LTE/LTE-A system.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI, and PUCCH format 3 is used mainly to transmit ACK/NACK information.

In general, a network uses many methods to obtain location information about a UE in a cellular communication system. Among them, there is an observed time difference of arrival (OTDOA)-based positioning scheme in which a UE is configured with positioning reference signal (PRS) transmission-related information about eNBs by a higher-layer signal, measures PRSs received from neighbor cells, and transmits, to an eNB or the network, the difference between the reception time of a PRS transmitted by a reference eNB and the reception time of a PRS signal transmitted by a neighbor eNB, known as a reference signal time difference (RSTD), and the network calculates the location of the UE based on the RSTD and other information in the LTE system. Besides, there are also other methods including an assisted global navigation satellite system (A-GNSS) positioning scheme, an enhanced cell ID (E-CID) scheme, and an uplink time difference of arrival (UTDOA)-based positioning scheme. These positioning schemes may be used for various location-based services (e.g., advertisement, position tracking, emergency communication means, and so on).

[LTE Positioning Protocol]

In the LTE system, an LTE positioning protocol (LPP) is defined to support the OTDOA scheme. In the LPP, an OTDOA-ProvideAssistanceData information element (IE) having the following configuration is indicated to a UE.

TABLE 5

```
-- ASN1START
OTDOA-ProvideAssistanceData ::= SEQUENCE {
  otdoa-ReferenceCellInfo    OTDOA-ReferenceCellInfo
      OPTIONAL,  -- Need ON
  otdoa-NeighbourCellInfo    OTDOA-NeighbourCellInfoList
      OPTIONAL,  -- Need ON
```

TABLE 5-continued

```
  otdoa-Error
      OTDOA-Error
      OPTIONAL,
      -- Need ON
  ...
}
-- ASN1STOP
```

In Table 5, OTDOA-ReferenceCellInfo indicates a cell serving as a reference for RSTD measurement, having the following configuration.

TABLE 6

```
-- ASN1START
OTDOA-ReferenceCellInfo ::= SEQUENCE {
    physCellId              INTEGER (0..503),
    cellGlobalId            ECGI
       OPTIONAL,            -- Need ON
    earfcnRef               ARFCN-ValueEUTRA
       OPTIONAL,            -- Cond NotSameAsServ0
    antennaPortConfig       ENUMERATED {ports1-or-2,
ports4, ... }
       OPTIONAL,            -- Cond NotSameAsServ1
    cpLength                ENUMERATED { normal,
extended, ... },
    prsInfo                 PRS-Info
       OPTIONAL,            -- Cond PRS...,
    [[ earfcnRef-v9a0       ARFCN-ValueEUTRA-v9a0
       OPTIONAL             -- Cond NotSameAsServ2]]
    }
-- ASN1STOP
```

Herein, conditional presence is given as follows.

TABLE 7

| Conditional presence | Explanation |
|---|---|
| NotSameAsServ0 | This field is absent if earfcnRef-v9a0 is present. Otherwise, the field is mandatory present if the EARFCN of the OTDOA assistance data reference cell is not the same as the EARFCN of the target devices's current primary cell. |
| NotSameAsServ1 | The field is mandatory present if the antenna port configuration of the OTDOA assistance data reference cell is not the same as the antenna port configuration of the target devices's current primary cell. |
| NotSameAsServ2 | The field is absent if earfcnRef is present. Otherwise, the field is mandatory present if the EARFCN of the OTDOA assistance data reference cell is not the same as the EARFCN of the target devices's current primary cell. |
| PRS | The field is mandatory present if positioning reference signals are available in the assistance data reference cell; otherwise it is not present. |

Further, OTDOA-ReferenceCellInfo has the following individual fields.

TABLE 8

OTDOA-ReferenceCellInfo field descriptions physCellId

This field specifies the physical cell identity of the assistance data reference cell.

cellGlobalId

This field specifies the ECGI, the globally unique identity of a cell in E-TRA, of the assistance data reference cell. The server should include this field if it considers that it is needed to resolve ambiguity in the cell indicated by physCellId.

TABLE 8-continued

OTDOA-ReferenceCellInfo field descriptions earfcnRef

This field specifies the EARFCN of the assistance data reference cell.

antennaPortConfig

This field specifies whether 1 (or 2) antenna port(s) or 4 antenna ports for cell specific reference signals (CRS) are used in the assistance data reference cell.

cpLength

This field specifies the cyclic prefix length of the assistance data reference cell PRS if the prsInfo field is present, otherwise this field specifies the cyclic prefix length of the assistance data reference cell CRS.

prsInfo

This field specifies the PRS configuration of the assistance data reference cell.

OTDOA-NeighbourCellInfo provides information about cells (e.g., eNBs or transmission points (TPs)) for which RSTD is to be measured. OTDOA-NeighbourCellInfo may include information about a maximum of 24 neighbor cells for each of up to three frequency layers. That is, it may indicate information about a total of 72 (=3*24) cells to the UE.

TABLE 9

```
-- ASN1START
    OTDOA-NeighbourCellInfoList ::= SEQUENCE (SIZE (1..maxFreqLayers)) OF
OTDOA-NeighbourFreqInfo
    OTDOA-NeighbourFreqInfo ::= SEQUENCE (SIZE (1..24)) OF OTDOA-
NeighbourCellInfoElement
    OTDOA-NeighbourCellInfoElement ::= SEQUENCE {
        physCellId                         INTEGER
    (0..503).
        cellGlobalId                       ECGI
OPTIONAL,              -- Need ON
        earfcn                             ARFCN-
alueEUTRA          OPTIONAL,     -- Cond NotSameAsRef0
        cpLength                           ENUMERATED
{normal, extended, ...}
        OPTIONAL,          -- Cond NotSameAsRef1
        prsInfo                            PRS-Info
        OPTIONAL,          -- Cond NotSameAsRef2
        antennaPortConfig                  ENUMERATED (ports-
1-or-2, ports-4, ...}
        OPTIONAL,          -- Cond NotsameAsRef3
        slotNumberOffset                   INTEGER (0..19)
        OPTIONAL,          -- Cond NotSameAsRef4
        prs-SubframeOffset                 INTEGER (0..1279)
        OPTIONAL,          -- Cond InterFreq
        expectedRSTD                       INTEGER (0..16383),
        expectedRSTD-Uncertainty           INTEGER (0..1023),
        ...,
        [[ earfcn-v9a0                     ARFCN-ValueEUTRA-v9a0
OPTIONAL           -- Cond NotSameAsRef5]]
    }
        maxFreqLayers      INTEGER ::= 3
-- ASN1STOP
```

Herein, conditional presence is given as follows.

TABLE 10

| Conditional presence | Explanation |
| --- | --- |
| NotsameAsRef0 | The field is absent if earfcn-v9a0 is present. If earfcn-v9a0 is not present, the field is mandatory present if the EARFCN is not the same as for the assistance data reference cell; otherwise it is not present. |

TABLE 10-continued

| Conditional presence | Explanation |
| --- | --- |
| NotsameAsRef1 | The field is mandatory present if the cyclic prefix length is not the same as for the assistance data reference cell; otherwise it is not present. |
| NotsameAsRef2 | The field is mandatory present if the PRS configuration is not the same as for the assistance data reference cell; otherwise it is not present. |
| NotsameAsRef3 | The field is mandatory present if the antenna port configuration is not the same as for the assistance data reference cell; otherwise it is not present. |
| NotsameAsRef4 | The field is mandatory present if the slot timing is not the same as for the assistance data reference cell; otherwise it is not present. |
| NotSameAsRef5 | The field is absent if earfcn is present. If earfcn is not present, the field is mandatory present if the EARFCN is not the same as for the assistance data reference cell; otherwise it is not present. |
| InterFreq | The field is optionally present, need OP, if the EARFCN is not the same as for the assistance data reference cell; otherwise it is not present. |

OTDOA-NeighbourCellInfoList has the following individual fields.

TABLE 11

OTDOA-NeighbourCellInfoList field descriptions physCellId

This field specifies the physical cell identity of the assistance data reference cell.

cellGlobalId

This field specifies the ECGI, the globally unique identity of a cell in E-UTRA, of the assistance data reference cell. The server should

TABLE 11-continued

OTDOA-NeighbourCellInfoList field descriptions include this field if it considers that it is needed to resolve ambiguity in the cell identified by physCellId.
earfcnRef This field specifies the EARFCN of the assistance data reference cell.
antennaPortConfig This field specifies whether 1 (or 2) antenna port(s) or 4 antenna ports for cell specific reference signals (CRS) are used in the assistance data reference cell.
cpLength This field specifies the cyclic prefix length of the neigbour cell PRS if PRS are present in this neighbor cell, otherwise this field specifies the cyclic prefix length of CRS in this neighbor cell.
prsInfo This field specifies the PRS configuration of the neighbour cell.
When the EARFCN of the neighbour cell is the same as for the assistance data reference cell, the target device may assume that each PRS positioning occasion in the neighbour cell at least partially overlaps with a PRS positioning occasion in the assistance data reference cell where the maximum offset between the transmitted PRS positioning occasions may be assumed to not exceed half a subframe.
When the EARFCN of the neighbour cell is the same as for the assistance data reference cell, the target may assume that this cell has the same PRS periodicity (Tprs) as the assistance data reference cell.

The IE included in OTDOA-ReferenceCellInfo and OTDOA-NeighbourCellInfo, PRS-Info provides PRS information, specifically PRS Bandwidth, PRS Configuration Index (IPRS), Number of Consecutive Downlink Subframes, and PRS Muting Information as follows.

TABLE 12

```
    PRS-Info ::= SEQUENCE {
        prs-Bandwidth          ENUMERATED { n6, n15, n25, n50, n75,
n100, ... },
        prs-ConfigurationIndex INTEGER (0..4095),
        numDL-Frames              ENUMERATED {sf-1, sf-2, sf-4, sf-6, ...},
        ...,
        prs-MutingInfo-r9      CHOICE {
            po2-r9                  BIT STRING (SIZE(2)),
            po4-r9                  BIT STRING (SIZE(4)),
            po8-r9                  BIT STRING (SIZE(8)),
            po16-r9                 BIT STRING
(SIZE(16)),
            ...
        }
        OPTIONAL                -- Need OP
    }
    -- ASN1STOP
```

Figure 6:
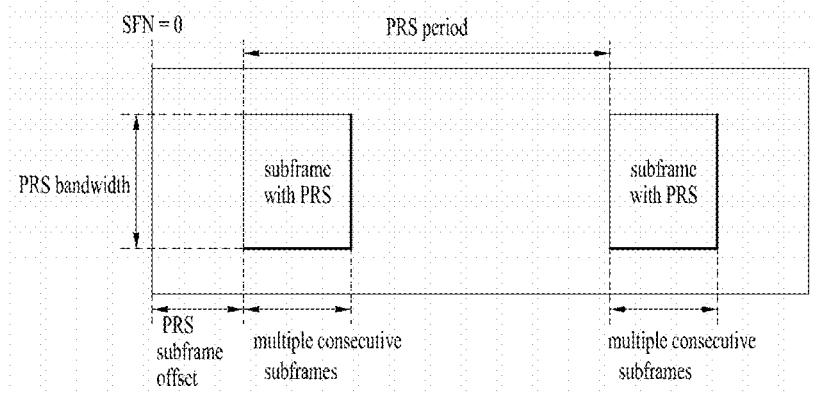
FIG. 6 is a diagram illustrating a positioning reference signal (PRS) transmission structure.

FIG. 6 illustrates a PRS transmission structure based on the above parameters.

PRS Periodicity and PRS Subframe Offset are determined according to the value of PRS Configuration Index (IPRS), and their relationship is illustrated in the following table.

TABLE 13

| PRS Configuration Index ($I_{PRS}$) | PRS Periodicity (subframes) | PRS Subframe Offset (subframes) |
|---|---|---|
| 0-159 | 160 | $I_{PRS}$ |
| 160-479 | 320 | $I_{PRS}$ − 160 |
| 480-1119 | 640 | $I_{PRS}$ − 480 |
| 1120-23399 | 1280 | $I_{PRS}$ − 1120 |

[Positioning Reference Signal (PRS)]

The PRS may have transmission opportunities, that is, positioning occasions with a periodicity of 160, 320, 640, or 1280 ms, and may be transmitted during consecutive N DL subframes in a positioning occasion. Herein, N may be 1, 2, 4, or 6. Although the PRS may be substantially transmitted in the positioning occasion, the PRS may be muted for inter-cell interference control cooperation. Information about the PRS muting is signaled to a UE by prs-Muting-Info. The transmission bandwidth of the PRS may be configured independently of the system band of a serving BS, and the PRS may be transmitted in a frequency band of 6, 15, 25, 50, 75, or 100 RBs. A transmission sequence of the PRS is generated by initializing a pseudo-random sequence generator in every OFDM symbol by a function of a slot index, an OFDM symbol index, a CP type, and a cell ID. The generated PRS transmission sequence may be differently mapped to REs depending on a normal CP or an extended CP. The positions of the mapped REs may be shifted on the frequency axis, and the shift value is determined by the cell ID.

The UE receives configuration information for a list of PRSs to be detected from a location management server of the network, for PRS measurement. The information includes PRS configuration information of a reference cell and PRS configuration information of neighbor cells. Configuration information about each PRS specifies the occurrence periodicity and offset of a positioning occasion, the number of consecutive DL subframes in one positioning occasion, a cell ID used to generate a PRS sequence, a CP type, and the number of CRS antenna ports considered for PRS mapping. In addition, the PRS configuration information of the neighbor cells includes slot offsets and subframe offsets between the neighbor cells and the reference cell, expected RSTDs, and the uncertainties of the expected RSTDs, to support the UE's determination of a time and a time window for PRS monitoring to detect PRSs transmitted by the neighbor cells.

For example, FIG. 7 is a diagram illustrating PRS-to-RE mapping. A transmission sequence of a PRS may be generated by initializing a pseudo-random sequence generator in every OFDM symbol by a function of a slot index, an OFDM symbol index, a CP type, and a physical cell ID. In the case of the normal CP, the generated PRS transmission sequence may be mapped as illustrated in FIG. 7(a). In the case of the extended CP, the generated PRS transmission sequence may be mapped as illustrated in FIG. 7(b). The positions of the mapped REs may be shifted on the frequency axis, and the shift value may be determined by the physical cell ID. For example, when the frequency shift is 0, REs carrying the PRS may be located as illustrated in FIGS. 7(a) and 7(b).

The afore-mentioned RSTD may refer to a relative timing difference between adjacent or neighbor cell j and reference cell i. That is, the RSTD may be represented as $T_{subframeRxj} - T_{subframeRxi}$ where $T_{subframeRxj}$ is a time at which the UE receives the start of a specific subframe from neighbor cell j, and $T_{subframeRxi}$ is a time at which the UE receives the start of a subframe corresponding to the specific frame from reference cell i, the subframe being closest to the specific frame in time. A reference point for the observed subframe time difference is an antenna connector of the UE.

As described above, the network may use various methods to obtain location information about a UE in a wireless communication system.

However, positioning is performed in conformance to the LPP based on an application of triangulation and radar technology in positioning schemes in a conventional cellular network, as described before. Therefore, at least three GPS satellite signals are required, thereby taking much time. Moreover, the afore-described TDOA/OTDOA scheme requires at least three references and a round trip (two-way) time, for positioning. Therefore, there may be need for a one-way positioning technique based on a single cell (one reference), which is required in NR and mmWave.

For example, although a one-way positioning technique using a phase difference has been proposed, a current detection technique using a phase difference in one direction has limitations. As a positioning scheme required for 5G NR and mmWave, a one reference-based one-way positioning technique is proposed below. If the one cell-based one-way technique is applicable, performance may be improved in terms of latency, and a plurality of references may not be used, thereby improving positioning efficiency. This will be described later.

Figure 8:
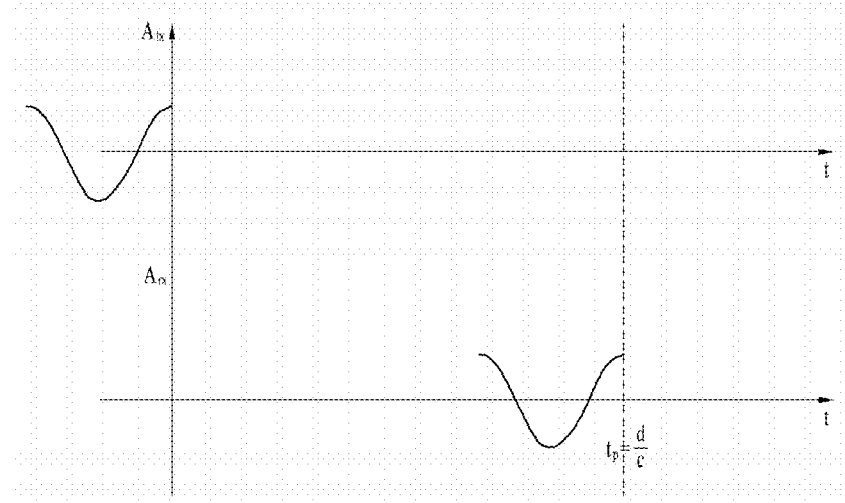
FIG. 8 is a diagram illustrating a method of obtaining location information based on a phase difference.

FIG. 8 is a diagram illustrating a method of obtaining location information based on a phase difference.

Referring to FIG. 8, a waveform used for positioning is usually represented as $A(t,x) = \cos(\omega t - kx)$ and a receiver at a position with a distance of d may receive a signal after a propagation time as long as $$t_p = \frac{d}{c}.$$

A phase at the receiver may be $$\omega t_p - kd = \omega \frac{d}{c} - \frac{\omega}{c}d,$$

and may always be equal to a phase transmitted at t=0.

Therefore, phase difference information about waves is not known to the receiver. That is, in the case of one-way transmission, the receiver may not obtain the phase difference information.

For example, when a frequency is given at a phase velocity represented by $$v_p \triangleq \frac{\lambda}{T} = \frac{\lambda}{2\pi} \frac{2\pi}{T} = \frac{\omega}{k}$$

and a transmitted medium value is determined, a phase velocity and a group velocity that affect a phase difference may be determined independently of propagation. Further, a wavelength may be assumed to be given by Equation 1 in a frequency with only a slight difference.

$$\cos[(\omega+\Delta\psi)t - (k+\Delta k)x] + \cos[(\omega-\Delta\omega)t - (k-\Delta k)x] = 2\cos(\Delta\omega t - \Delta kx)\cos(\omega t - kx) \quad \text{[Equation 1]}$$

A derived value $2\cos(\Delta\omega t - \Delta kx)$ may have a phase velocity of $$\frac{\Delta\omega}{\Delta k}.$$

Further, the envelope amplitude may include a group of internal waves, and the velocity may be a group velocity. In general, once the medium value of the frequency is determined, the phase velocity may be determined by $$v_p = \frac{\omega}{k}.$$

Further, the group velocity may be defined as $$v_g = \frac{d\omega}{dk}.$$

A refractive index n defined by the relationship between the speed of light and the phase velocity may be given by Equation 2.

$$n = \frac{c}{v_p} = c\frac{k}{\omega} \quad \text{[Equation 2]}$$

Herein, the group velocity may be $$v_g = v_p\left(1 - \frac{k}{n}\frac{dn}{dk}\right),$$

and if the medium value is the same and air is considered as a general medium, $$\frac{dn}{dk} = 0$$

and thus $v_g = v_p$. That is, since the phase velocity and the group velocity represent only waves transmitted after a propagation time in FIG. 8, one-way measurement may be impossible.

More specifically, since the transmitter transmits a wave to the receiver and the receiver has no knowledge of a propagation-based phase, one-way phase difference of arriving signal (PDOA) may have limitations. This may be different from a ranging technique applied to a radar. For example, the radar may perform positioning in a two-way method in which a signal propagated from a receiver reaches a target and then reflects back from the target. Since the receiver knows the timing of the transmitted signal, time-based positioning is possible in the radar technique. However, a signal transmitted by a receiver is not reflected in the cellular network, and thus one-way transmission and reception is possible, thereby making it impossible to measure a distance based on reflected waves in a radar. Therefore, a new method may be needed for one-way positioning. For example, range and direction information may be required to obtain location information. Accordingly, range determination and direction determination may be needed, which will be described in consideration of a one-way positioning scheme.

From Perspective of UE, BS→UE

Range Determination

A UE may set a time reference by using system information broadcast by a gNB and patterned RSs of a specific beam. For example, the UE may identify a system frame number (SFN) from a master information block (MIB) received periodically from the gNB. The UE may synchronize with a DL timing based on a predetermined pattern from an RS of a positioning-related beam. The UE may identify time at an OFDM symbol level. That is, the UE may identify a DL timing in terms of a frame number, a subframe number, and a symbol.

That is, the UE and the gNB may synchronize their timings for time with each other at the OFDM symbol level as described above. Thus, a reference time for positioning may be set.

The gNB may trigger a positioning mechanism. For example, the gNB may broadcast time stamp-related information indicating a transmitted time in an RS of a positioning-related beam to the UE. That is, the gNB may provide time information about the transmitted time to the UE. When the UE identifies a DL timing indicating an absolute time from the information broadcast from the gNB, the UE may decode the time stamp information from the received DL signal. Thus, the UE may calculate a time taken for the transmission based on the difference between the transmitted time of the RS of the beam from the gNB and a time at which the RS of the beam is actually measured, and determine the distance between the gNB and the UE.

That is, the UE may identify the time at which the signal has been transmitted by the gNB based on the time stamp information. Further, the UE may determine the arrival time of the signal by decoding the time stamp information from the DL signal and obtain information about the distance between the UE and the gNB based on the time difference.

For example, the UE may perform positioning by using a signal transmitted in one direction by the gNB. In another example, the BS may perform positioning by using a signal transmitted in one direction by the UE. Now, a description will be given of a UE-based positioning method and a gNB-based positioning method.

Direction Determination

Once range information is obtained in the above manner, the UE estimates a direction from a plurality of measured beams.

Figure 9:
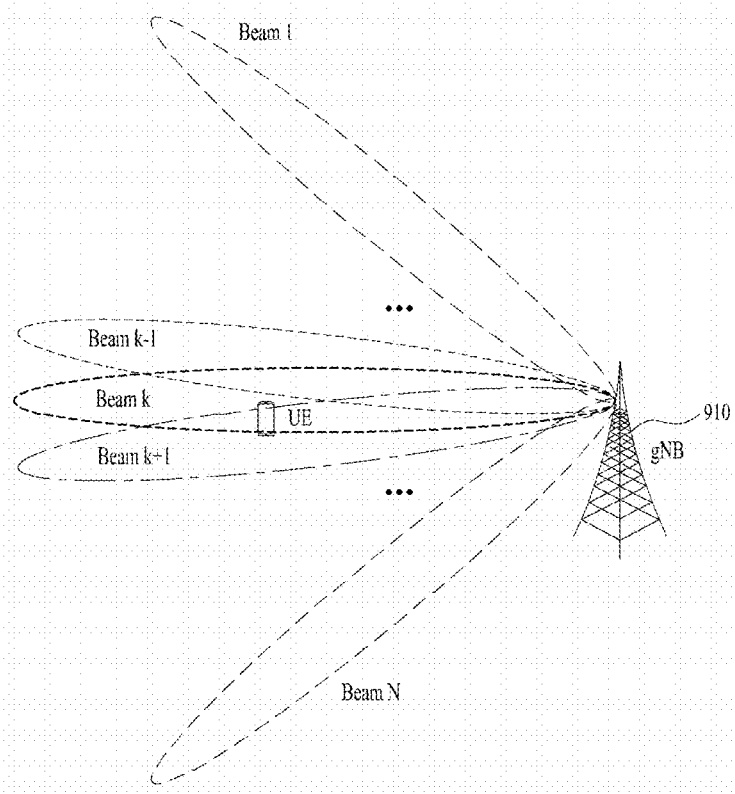
FIG. 9 is a diagram illustrating a positioning method based on the difference between beams transmitted by one BS, performed by a UE.

For example, referring to FIG. 9, a gNB 910 may transmit a plurality of beams. For example, a case in which beam k and beam k+1 are measured to be stronger than any other beam may be considered. Let a spacing between the beams at the gNB 910 be denoted by θ. Then, when the signal power measurements of beam k and beam k+1 are $P_{Beamk}$ and $P_{Beamk+1}$ and the directions of beam k and beam k+1 expected at the UE are $θ_k$ and $θ_{k+1}$, the direction from the UE to the gNB may be determined by Equation 3. That is, the UE may estimate the direction to the gNB based on the measurement of each beam and information about the spacing between the beams. For example, the information about the spacing between the beams may be shared between the UE and the gNB.

$$\Theta = \frac{P_{Beamk} * θ_{k+1} + P_{Beamk+1} * θ_k}{P_{Beamk} + P_{Beamk+1}}$$ [Equation 3]

Figure 10:
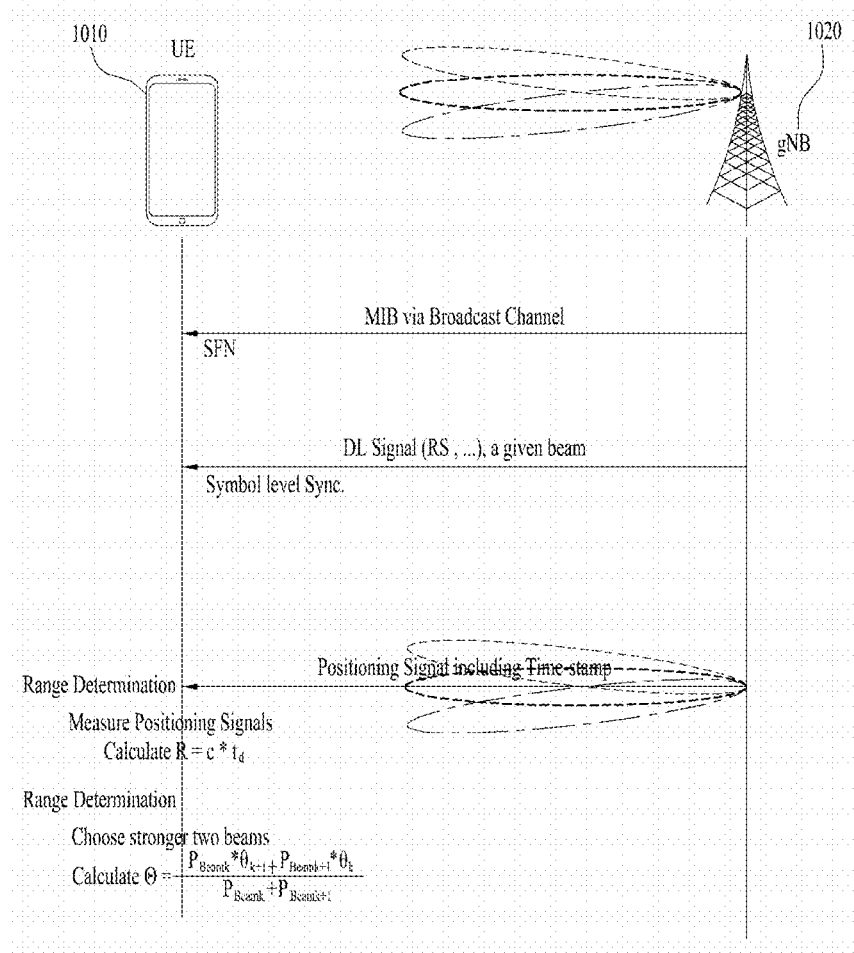
FIG. 10 is a diagram illustrating a method of obtaining location information based on a one-way positioning technique, performed by a UE.

FIG. 10 is a diagram illustrating a signal flow for a method of obtaining location information based on one-way positioning by a UE. As described above, FIG. 10 illustrates an embodiment of a method of performing positioning by using a signal transmitted in one direction from a gNB to a UE by the UE.

Referring to FIG. 10, a UE 1010 may periodically receive MIB information from a gNB 1020. The gNB 1020 may broadcast the MIB information to UEs 1010 within coverage by a selected beam or a plurality of beams. Upon receipt of the MIB, the UE 1010 may obtain information about an SFD included in the MIB by decoding the MIB. The UE 1010 may collect time information at a symbol level by identifying a pattern from RSs received from the gNB 1020. That is, the UE 1010 may identify the pattern of RSs as a DL signal transmitted by a selected beam or a plurality of beams and synchronize with the DL signal. Further, the UE 1010 may identify a DL timing in terms of a frame number, a subframe number, and a symbol. That is, the UE 1010 may share information about an absolute time at an OFDM symbol level with the gNB 1020.

Subsequently, the gNB 1020 may allocate a signal for positioning including a time stamp to one or more beams and transmit the signal for positioning by the beams to the UE 1010. Upon receipt of the time stamp from the gNB 1020, the UE 1010 may calculate a time taken for the transmission between the gNB 1020 and the UE 1010 by the difference between the arrival time of the signal for positioning and the time stamp based on time information monitored from the MIB and the RSs and the time stamp, as given by Equation 4. In Equation 4, Measured Time may be a time at which the signal for positioning transmitted by the gNB 1020 has been measured.

$$T_d = \text{Measured Time} - \text{Timestamp}$$ [Equation 4]

For example, the distance may be calculated by R=t_d*c, using the speed of light c as the velocity of the signal.

Subsequently, the UE 1010 may receive a plurality of beams from the gNB 1020. The UE 1010 may estimate a direction by using two of the plurality of received beams. The UE 1010 may predict the directions of the beams based on Equation 3. That is, the UE 1010 may measure the power of each of the two beams and obtain direction information from information about the spacing or angle between the beams. For example, as described before, when beam K and beam K+1 have the largest signal strengths, the UE 1010 may measure $P_{Beamk}$ and $P_{Beamk+1}$. The angles of the beams are $θ_k$ and $θ_{k+1}$, which may be direction angles allocated to the beams. Therefore, the UE 1010 may determine the directions of the beams and a distance, and the foregoing embodiment should not be construed as limiting. That is, the UE 1010 may perform positioning in the one-way direction positioning technique with one gNB 1020, thereby preventing latency. Further, positioning may be possible only with one cell without the need for using a plurality of references.

From the Perspective of gNB, UE→gNB

The above description has been made from the perspective of the UE. The gNB may perform positioning based on a one-way signal received from the UE, which will be described below.

Range Determination

The UE may determine a distance based on a signal transmitted from the gNB to the UE. In the same manner, the gNB determines a distance based on a signal received from the UE. In this case, the UE may also set a time reference by using system information broadcast by the gNB and patterned RSs of a specific beam. The UE may receive an MIB periodically from the gNB. The UE may identify an SFN from the MIB and synchronize with a DL timing based on a predetermined pattern of RSs of a positioning-related beam. As described before, the UE may identify time at an OFDM symbol level. Herein, the UE may identify time at an OFDM symbol level. That is, the UE may identify a DL timing in terms of a frame number, a subframe number, and a symbol.

That is, as described before, the UE and the gNB may synchronize their timings for time with each other at the OFDM symbol level. Thus, a reference time for measurement may be set.

The UE may transmit, to the gNB, time stamp-related information indicating a timing of transmission to the gNB based on information of the synchronized DL signal. The gNB may then calculate a time taken for transmission based on the difference between a time at which the signal has been transmitted by the UE and a time at which the signal has been received, and calculate an actual distance between the UE and the gNB based on the time taken for transmission.

Direction Determination

Further, a direction may be determined in a similar manner to the foregoing description. Once the distance is calculated as described above, the gNB may estimate a direction using a plurality of beams by measuring a received signal.

Figure 11:
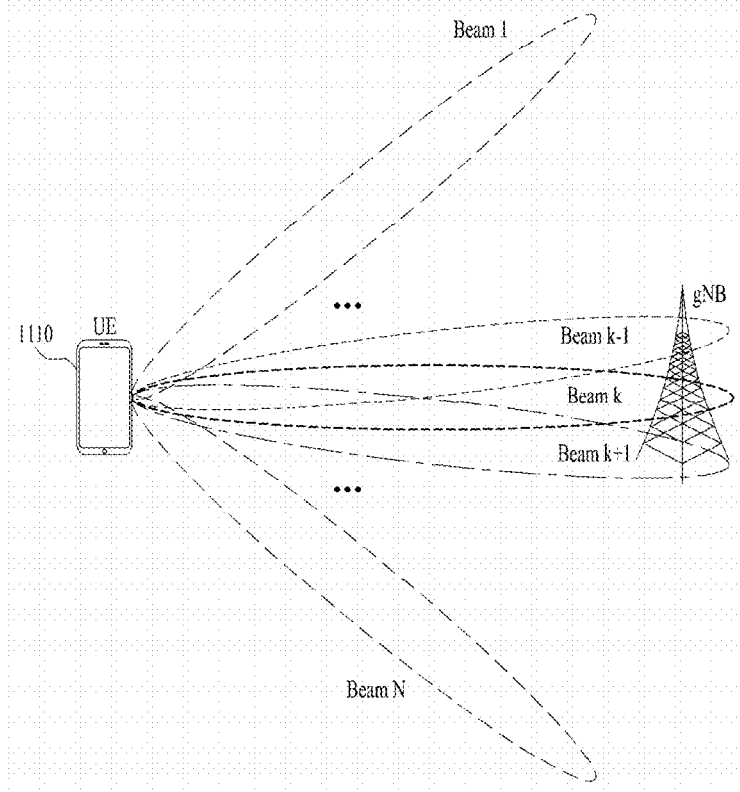
FIG. 11 is a diagram illustrating a positioning method based on the difference between beams transmitted by one UE, performed by a BS.

For example, a UE 1110 may transmit a plurality of beams in FIG. 11. Considering that beam k and beam k+1 are stronger than any other beam, direction information may be obtained by Equation 5 using the spacing between the beams, θ, as described before.

$$\Theta = \frac{P_{Beamk} * \theta_{k+1} + P_{Beamk+1} * \theta_k}{P_{Beamk} + P_{Beamk+1}} \quad \text{[Equation 5]}$$

Figure 12:
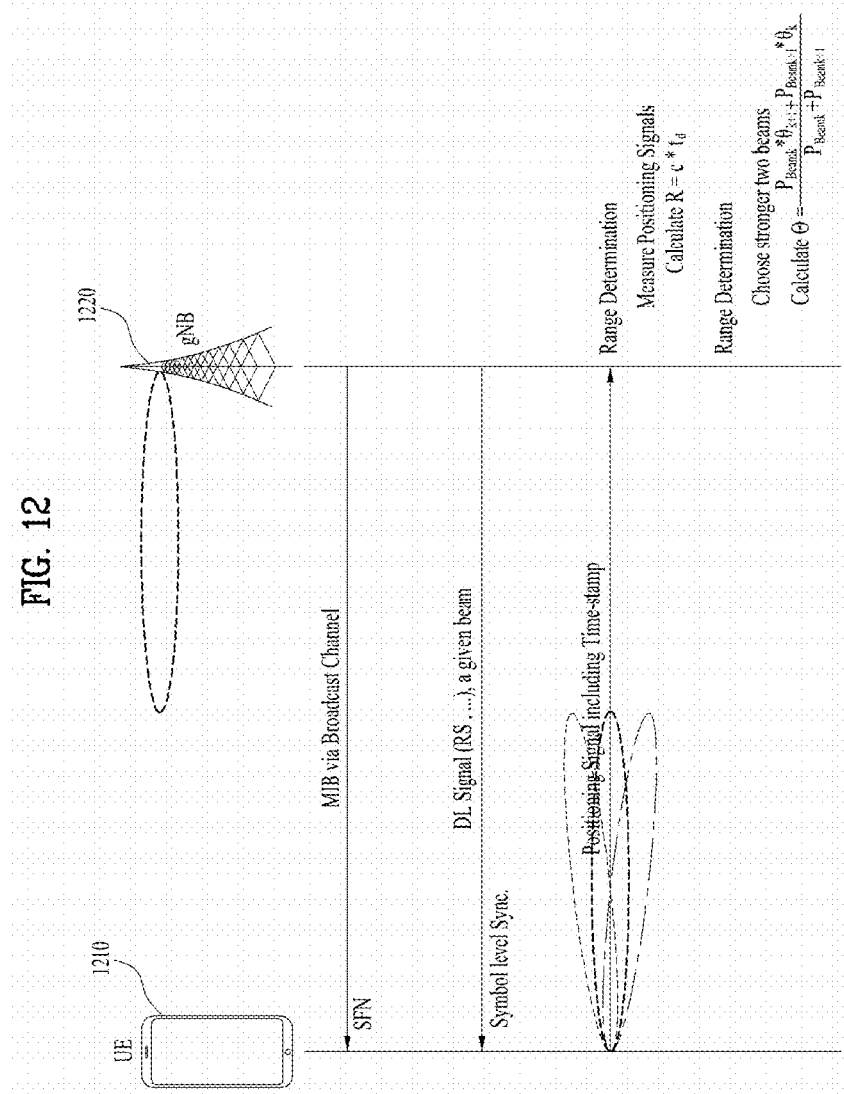
FIG. 12 is a diagram illustrating a method of obtaining location information based on a one-way positioning technique, performed by a BS.

FIG. 12 is a diagram illustrating a signal flow for a method of obtaining location information based on one-way positioning by a gNB. As described above, FIG. 12 illustrates an embodiment of a method of performing positioning by using a signal transmitted in one direction from a gNB to a UE by the gNB.

Referring to FIG. 12, a UE 1210 may periodically receive MIB information from a gNB 1220. The gNB 1220 may broadcast the MIB information to UEs 1210 within coverage by a selected beam or a plurality of beams. Upon receipt of the MIB, the UE 1210 may obtain information about an SFD included in the MIB by decoding the MIB. The UE 1210 may collect time information at a symbol level by identifying a pattern from RSs received from the gNB 1220. That is, the UE 1210 may identify the pattern of RSs as a DL signal transmitted by a selected beam or a plurality of beams and synchronize with the DL signal. Further, the UE 1210 may identify a DL timing in terms of a frame number, a subframe number, and a symbol. That is, the UE 1210 may share information about an absolute time at an OFDM symbol level with the gNB 1220.

Subsequently, the UE 1210 may allocate a signal for positioning including a time stamp to one or more beams and transmit the signal for positioning to the gNB 1220. Upon receipt of the time stamp form the UE 1210, the gNB 1220 may calculate a time taken for transmission between the gNB 1220 and the UE 1210 by the difference between the arrival time of the signal for positioning and the time stamp by Equation 6. In Equation 6, Measured Time may be a time at which the signal for positioning transmitted by the UE 1210 has been measured.

$$T_d = \text{Measured Time} - \text{Timestamp} \quad \text{[Equation 6]}$$

For example, the distance may be calculated by $R = t_d * c$, using the speed of light c as the velocity of the signal.

Subsequently, the gNB 1220 may receive a plurality of beams from the UE 1210. The gNB 1220 may estimate a direction by using two of the plurality of received beams. The gNB 1220 may predict the directions of the beams based on Equation 5. That is, the gNB 1220 may measure the power of each of the two beams and obtain direction information from information about the spacing or angle between the beams. For example, as described before, when beam K and beam K+1 have the largest signal strengths, the gNB 1220 may measure $P_{Beamk}$ and $P_{Beamk+1}$. The angles of the beams are $\theta_k$ and $\theta_{k+1}$, which may be directional angles allocated to the beams. Therefore, the gNB 1220 may determine the directions of the beams and a distance, and the foregoing embodiments should not be construed as limiting. That is, the gNB 1220 may perform positioning based on one-way direction positioning with one UE 1210, thereby preventing latency. Further, positioning may be possible only with one cell without the need for using a plurality of references.

FIG. 13 is a diagram illustrating a positioning method of a UE.

The UE may receive MIB information from a gNB (S1310). The UE may then set a time reference based on the received MIB information. As described before with reference to FIGS. 1 to 12, the MIB may include SFN information. As described before, the UE may identify the SFN in the MIB and acquire DL synchronization by using a predetermined pattern of RSs of a positioning-related beam. For example, the UE and the gNB may identify an absolute time at an OFDM symbol level. Therefore, the UE may identify time information about a signal transmitted by the gNB.

Subsequently, the UE may receive a positioning-related signal from the gNB (S1330). As described before with reference to FIGS. 1 to 12, the positioning-related signal may include time stamp information. The time stamp information may be time information about a signal transmitted by the gNB.

The UE may then measure the positioning-related signal (S1340). As described before with reference to FIGS. 1 to 12, the UE may obtain information about a time at which the positioning-related signal is measured. The UE has performed synchronization with the gNB at the OFDM symbol level based on the MIB and the pattern of the RSs, and thus may obtain distance information by using the above information. That is, the UE may obtain information about the distance between the UE and the gNB by using the difference between the measured time of the positioning-related signal and the time stamp information.

Then, the UE may obtain distance information and direction information about the UE based on the positioning-related signal (S1350). As described before with reference to FIGS. 1 to 12, the distance information about the UE may be obtained based on the time stamp information and the information about the time at which the positioning-related signal has been measured. Further, for example, the gNB may transmit the positioning-related signal to the UE by one or more beams. The UE and the gNB may share information about the plurality of beams. The information about the plurality of beams shared between the UE and the gNB may be information about the spacing or phase difference between the beams, not limited to the foregoing embodiment.

The UE may measure the reception power of the plurality of beams. The UE may obtain information about the directions of the beams by Equation 3 or Equation 5 based on the reception power of the beams. Thus, the UE may obtain information about a direction to the gNB. That is, the UE may perform positioning by using one gNB, not limited to the foregoing embodiment.

The embodiments of the present disclosure may be implemented using various means. For instance, the embodiments of the present disclosure may be implemented using hardware, firmware, software, or any combinations thereof.

In case of the implementation by hardware, a method according to embodiments of the present disclosure may be implemented by one or more of application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, and the like.

In case of the implementation by firmware or software, a method according to embodiments of the present disclosure may be implemented by modules, procedures, or functions for performing the above-described functions or operations. Software code may be stored in a memory unit and executed by a processor. The memory unit may be provided within or outside the processor to exchange data with the processor by various known means.

As described above, the detailed description of the preferred examples of the present disclosure has been given to enable those skilled in the art to implement and practice the disclosure. Although the disclosure has been described with reference to exemplary embodiments, those skilled in the art will appreciate that various modifications and variations can be made in the present disclosure without departing from the spirit or scope of the disclosure described in the appended claims. Accordingly, the disclosure should not be limited to the specific examples described herein, but should be accorded the broadest scope consistent with the principles and novel features disclosed herein.

Both a product invention and a method invention have been described herein. When needed, the descriptions of both the inventions may be applied supplementally.

INDUSTRIAL APPLICABILITY

The present disclosure is applicable to various wireless communication systems including IEEE 802.16x and 802.11x systems as well as 3GPP LTE and LTE-A systems and, more particularly, to a communication system using an ultra-high frequency band.

The invention claimed is:

1. A method of performing positioning by a user equipment (UE) in a wireless communication system, the method performed by the UE and comprising:

receiving, from a base station (BS), master information block (MIB) information;
setting a time reference based on the MIB information;
receiving, from the BS, a positioning-related signal allocated to a plurality of beams;
measuring received power information of two beams having a largest signal strength among the plurality of beams based on the positioning-related signal; and
obtaining distance information about the UE and direction information about the UE based on the measured positioning-related signal,
wherein the direction information is obtained from the received power information based on information of direction angles allocated to the two beams.

2. The method according to claim 1, wherein the positioning-related signal includes a time stamp, and the time stamp is information about a transmitted time of the positioning-related signal.

3. The method according to claim 2, further comprising obtaining information about a measured time of the positioning-related signal,
wherein the distance information about the UE is obtained by using the information about the measured time of the positioning-related signal based on the set time reference and the time stamp.

4. The method according to claim 3, wherein the UE and the BS share information about an absolute time based on the set time reference.

5. The method according to claim 4, wherein the UE and the BS share the information about the absolute time at an orthogonal frequency division multiplexing (OFDM) symbol level based on the set time reference.

6. The method according to claim 3, wherein the distance information is measured based on a difference between the information about the measured time of the positioning-related signal and the time stamp.

7. The method according to claim 1, wherein the information of the direction angles of the plurality of beams is shared between the UE and the BS.

8. The method according to claim 1, wherein the MIB information is periodically broadcast by the BS.

9. A user equipment (UE) for performing positioning in a wireless communication system, the UE comprising:
a receiver configured to receive a signal;
a transmitter configured to transmit a signal; and
a processor configured to control the receiver and the transmitter,
wherein the processor is configured to:
receive, from a base station (BS), master information block (MIB) information;
set a time reference based on the MIB information;
receive, from the BS, a positioning-related signal allocated to a plurality of beams;
measure received power information of two beams having a largest signal strength among the plurality of beams based on the positioning-related signal; and
obtain distance information about the UE and direction information about the UE based on the measured positioning-related signal,
wherein the direction information is obtained from the received power information based on information of direction angles allocated to the two beams.

10. The UE according to claim 9, wherein the positioning-related signal includes a time stamp, and the time stamp is information about a transmitted time of the positioning-related signal.

11. The UE according to claim 10, wherein the processor is configured to further obtain information about a measured time of the positioning-related signal, and obtain the distance information about the UE by using the information about the measured time of the positioning-related signal based on the set time reference and the time stamp.

12. The UE according to claim 11, wherein the UE and the BS share information about an absolute time based on the set time reference.

13. The UE according to claim 12, wherein the UE and the BS share the information about the absolute time at an orthogonal frequency division multiplexing (OFDM) symbol level based on the set time reference.

14. The UE according to claim 11, wherein the distance information is measured based on a difference between the information about the measured time of the positioning-related signal and the time stamp.

15. The UE according to claim 9, wherein the information of the direction angles of the plurality of beams is shared between the UE and the BS.

16. The UE according to claim 15, wherein the MIB information is periodically broadcast by the BS.

\* \* \* \* \*